March 22, 1960 E. TAUTNER 2,930,005

NETWORK FOR FREQUENCY-MODULATED SIGNALS

Filed June 18, 1957

INVENTOR
ERWIN TAUTNER

BY Frank R. Jifari
AGENT 2,930,005
Patented Mar. 22, 1960

2,930,005

NETWORK FOR FREQUENCY-MODULATED SIGNALS

Erwin Tautner, Hilversum, Netherlands, assignor to North American Philips Company, Inc., New York, N.Y., a corporation of Delaware Application June 18, 1957, Serial No. 666,384

Claims priority, application Netherlands June 27, 1956

4 Claims. (Cl. 333—70)

This invention relates to networks for the transmission of frequency-modulated signals with simultaneous suppression of undesirable amplitude modulation and higher harmonics of these signals. More particularly, it is an object of this invention to provide a network of this kind, which may, for example, be suited for the transmission of signals having a center frequency of more than 20 mc./s. and a frequency sweep of more than 5%, while the modulation frequency may exceed the frequency sweep.

In order to suppress the undesirable amplitude modulation of the frequency-modulated signals in such a network, which must be capable of passing very wide frequency bands at high frequencies, limiters of various known types can be used. It has, however, been found that owing to the high frequencies, only voltage-dependent resistances, preferably crystal diodes, are suitable for dependable operation.

A known limiting arrangement for frequency-modulated signals includes a band-pass filter comprising two coupled circuits, a limiter diode being connected in parallel with each of the circuits. For the aim in view, however, such an arrangement would produce an appreciable phase distortion of the signal to be transmitted.

It is an object of the present invention to avoid this difficulty and a network in accordance with the invention is characterized in that the network, which comprises a sequence of a plurality of sections, includes voltage-dependent parallel resistances, preferably crystal diodes, in each section, the resistance values of which effectively constitute an increasing series from the input terminals to the output terminals of the network for the maximum signal amplitude, so that the group transmission time of the network is substantially constant throughout the entire signal frequency band.

In order that the invention may readily be carried out, one embodiment thereof will now be described, by way of example, with reference to the accompanying diagrammatic drawings, in which.

Figure 1:
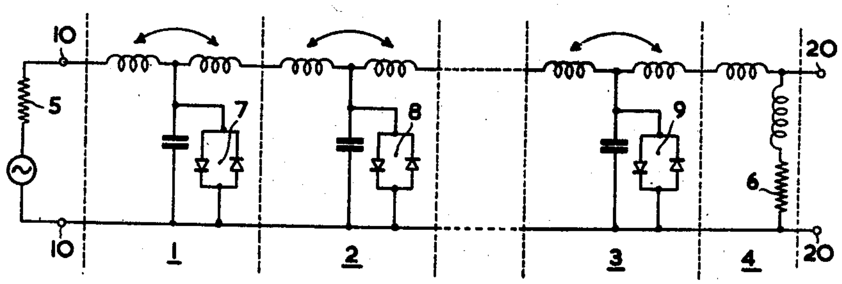
Fig. 1 shows an embodiment of a network in accordance with the invention.

Fig. 1 shows a network comprising the sequence of a number of sections 1, 2 . . . 3, 4, which together constitute a so-called ladder network. The frequency-modulated signals, which may be associated with undesirable amplitude modulation, are supplied to input terminals 10 of this network, signals which are substantially free from amplitude modulation being taken from output terminals 20. The network may, for example, form part of a beam transmitter system. In a modulator stage, a signal is generated having, for example, a center frequency of 50 mc./s. a frequency sweep of 6 mc./s., a modulation frequency of 10 mc./s. and an amplitude modulation which is associated with the frequency modulation and has a modulation depth of, say, 20%. The amplitude modulation and the undesirable harmonics are removed from this signal which is subsequently supplied to the required frequency multipliers and further transmitter stages.

Preferably, the network is designed as an *m*-derived low-pass Zobel network, where *m* is about 1.3. The T-sections 1, 2, 3 and the final half-T-section 4 each have an impedance $Z_0$ which is equal to the characteristic impedance of the network, the network being terminated by resistors 5 and 6 which are also equal to this characteristic impedance. The cut-off frequency is made so high that the undesirable harmonics of the signal are suppressed. In theory, with $m=1.338$ the group transmission time of the signal deviates by less than 4% through 75% of the pass-band. Consequently, the phase distortion of the signal to be transmitted which is introduced by the network, is negligible as compared with the thermal noise of the transmitter. Such networks, in which *m* is greater than 1, can be constituted by bridged T-sections (not shown) and/or mutually coupled self-inductions.

If between the input terminals 10 and the output terminals 20 of such a network voltage-dependent parallel resistances are connected, these resistances would produce not only a suppression of the undesirable amplitude modulation, but generally also would produce an undesirable phase distortion of the signal to be transmitted. This may, for example, be appreciated from the following example.

It is assumed that the voltages across the input terminals 10 and the output terminals 20 are in phase for the center frequency of the signal to be transmitted. Thus, the values of the said voltage-dependent parallel resistances will simultaneously increase and decrease with the instantaneous value of the signal, so that the peaks of this signal are damped most heavily. However, for a signal which differs from the center frequency, the input and output voltages are no longer in phase, so that the maximum degrees of damping produced by the said parallel resistances occur at different instants. The damping produced by the output parallel resistance can be considered as a reflected wave decreasing the input signal. Since this wave does not arrive at the output terminals 10 in phase with the instant at which the input parallel resistance produces maximum damping, there is produced a phase distortion which depends upon the amplitude modulation to be suppressed and may assume an undesirably high value.

The invention is based on the recognition that the resistances to be introduced in the network must be voltage-dependent in a manner such that the group transmission time for the entire signal to be transmitted remains substantially constant. To this end, each section 1, 2, 3 is provided with voltage-dependent parallel resistances 7, 8, 9. At the highest signal amplitude, the resistance 7 is adjusted to a resistance value exceeding the characteristic impedance $Z_0$ of the network. At this highest signal amplitude, the resistance 8 is adjusted to a value exceeding this adjustment value of the resistance 7, the resistance 9 is adjusted to a value exceeding the adjustment value of the resistance 8, and so on. Consequently, the adjustment value of the parallel resistances 7, 8 . . . 9 constitute an ascending series. They may, for example, be about $1.5\ Z_0$, $3\ Z_0$, $1.5\times2^{n-1}\ Z_0$, where *n* represents the number of whole sections.

According to a further feature of the invention, the introduction of these voltage-dependent resistances 7, 8, 9 can be considered as a mismatch of each section 1, 2, 3, and, as is well known, this entails reflections, that is to say standing waves, and a non-constant group transmission time. However, with a sufficient number of sections, the sole provision of the last and largest resistance 9 hardly disturbs the network. By making the value of the preceding resistance 8 greater than ⅓ of the value of the resistance 9, the standing-wave ratio between the last but one and the last sections is kept permissibly small, so that the influence on the group transmission time characteristic also remains permissible. Continuing in this manner, the resistance 7 must be at least ⅓ of the resistance 8, and so on. The first resistance 7, which is responsible for the worst disturbance of the network, must at least be equal to the characteristic impedance $Z_0$.

Consequently, it is of advantage to use the maximum number of sections without, however, exceeding a number corresponding to a sufficiently high adjustment value and a sufficient amplitude dependence of the last parallel resistance 9. When the signal amplitude is decreased, all the parallel resistances will be increased, so that not only the first parallel resistance 7 still exceeds $Z_0$, but also the ratio between the successive parallel resistances and consequently the standing-wave ratio remains substantially constant.

Figure 2:
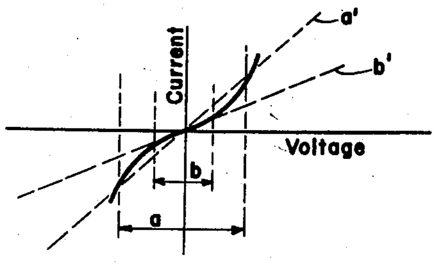
Fig. 2 is a current-voltage characteristic of a voltage-dependent resistance of the kind used in the network shown in Fig. 1.

As the voltage-dependent resistances, use is preferably made of parallel-connected crystal rectifiers connected with asymmetric conductivity with respect to one another, the combined current-voltage characteristic of which is shown in Fig. 2. By suitably proportioning the network, the signal voltages across each pair of rectifiers 7, 8, 9 can be successively attenuated so that the mean amplitude of these voltages gradually decreases with the result that the rectifiers show a successively higher adjustment resistance. For example, a relatively large signal, *a*, will effect a relatively steep operating slope *a'*, and a relatively smaller signal *b*, will effect a relatively gradual operating slope *b'*, and the steeper slope *a'* constitutes a lower value of operating resistance than does the slope *b'*. To this end, the section impedance must slightly differ from the characteristic impedance $Z_0$ of the network in a manner such that the transmission function of each section assumes the required value. As an alternative, suitable adjustment-voltage sources may be connected in series with the rectifier, however, this is generally more complicated.

In a practical embodiment, use was made of an *m*-derived network, *m* being equal to 1.34, of the kind shown in Fig. 1 and comprising five whole sections 1, 2 . . . 3 and the half section 4. The coupling coefficient between the inductances was 12%. The rectifiers of the parallel resistances 7, 8, 9 were of the type GEX 66 of General Electric Company, England, which have a resistance varying from about 6 kΩ at 10 mv. to about 120 Ω at 1 v. The signal frequency was 100 mc./s, with a frequency sweep of ±10 mc./s, the signal amplitude had a peak value of 1 v. and a modulation depth of 20%. This was reduced to ½%. Modulation depths up to 80% could be used without appreciable phase distortion. The modulation frequency was also 10 mc./s.

What is claimed is:

1. A low-pass network for the transmission of frequency-modulated signals with simultaneous suppression of undesirable amplitude modulation and higher harmonics of said signals, comprising a plurality of sections connected together sequentially, each of said sections comprising series inductor means and shunt capacitor means, and means for feeding said signals into the first of said sections, each of said sections additionally comprising a shunt connected voltage-dependent resistance connected to partially limit the amplitude of the signals passing therethrough, the resistance values of said voltage-dependent resistances being successively greater in succeeding sections of said network, whereby the group transmission time of said network is substantially constant throughout the frequency band of said signals.

2. A network as claimed in claim 1, in which each of said voltage-dependent resistances comprises a pair of crystal diodes connected in parallel with reverse polarities, and in which each of said sections attenuates said signals whereby the signals have a successively lower amplitude at the voltage-dependent resistances in the successive sections of said network.

3. A network as claimed in claim 1, in which said sections are designed to form an *m*-derived Zobel network in which *m* exceeds 1.

4. A network as claimed in claim 3, in which the resistance value of the voltage-dependent resistance in said first section is larger than the characteristic impedance of said network, and in which the value of the resistances in the succeeding sections are each less than three times the value of the preceding resistance.

References Cited in the file of this patent

UNITED STATES PATENTS

| | | |
|---|---|---|
| 1,969,657 | McCaa | Aug. 7, 1934 |
| 2,144,036 | Strecker | Jan. 17, 1939 |
| 2,153,857 | Wheeler | Apr. 11, 1939 |